United States Patent
Anvin

(10) Patent No.: US 8,041,876 B1
(45) Date of Patent: Oct. 18, 2011

(54) METHOD AND SYSTEM FOR PROVIDING HARDWARE SUPPORT FOR MEMORY PROTECTION AND VIRTUAL MEMORY ADDRESS TRANSLATION FOR A VIRTUAL MACHINE

(76) Inventor: H. Peter Anvin, San Jose, CA (US)

( * ) Notice: Subject to any disclaimer, the term of this patent is extended or adjusted under 35 U.S.C. 154(b) by 534 days.

(21) Appl. No.: 11/500,575

(22) Filed: Aug. 7, 2006

Related U.S. Application Data

(63) Continuation of application No. 10/607,934, filed on Jun. 27, 2003, now Pat. No. 7,111,146.

(51) Int. Cl.
*G06F 12/00* (2006.01)

(52) U.S. Cl. ...... 711/6; 711/163; 711/207; 711/E12.091

(58) Field of Classification Search ................ 711/207, 711/6
See application file for complete search history.

(56) References Cited

U.S. PATENT DOCUMENTS

| | | | |
|---|---|---|---|
| 4,816,991 A | 3/1989 | Watanabe et al. | |
| 4,920,477 A * | 4/1990 | Colwell et al. ................ | 711/207 |
| 5,294,897 A | 3/1994 | Notani et al. | |
| 5,317,705 A | 5/1994 | Gannon et al. | |
| 5,317,754 A | 5/1994 | Blandy et al. | |
| 5,574,878 A | 11/1996 | Onodera et al. | |
| 6,075,938 A | 6/2000 | Bugnion et al. | |
| 6,167,490 A | 12/2000 | Levy et al. | |
| 6,260,131 B1 | 7/2001 | Kikuta et al. | |
| 6,604,187 B1 | 8/2003 | McGrath et al. | |
| 6,907,600 B2 | 6/2005 | Neiger et al. | |
| 7,111,145 B1 | 9/2006 | Chen et al. | |
| 7,278,030 B1 | 10/2007 | Chen et al. | |
| 2004/0064668 A1 | 4/2004 | Kjos et al. | |
| 2004/0117593 A1 | 6/2004 | Uhlig et al. | |

OTHER PUBLICATIONS

Non-Final Office Action Dated Aug. 11, 2005; U.S. Appl. No. 10/607,934.
Notice of Allowance Dated Apr. 21, 2006; U.S. Appl. No. 10/607,934.

* cited by examiner

*Primary Examiner* — Kevin Ellis
*Assistant Examiner* — Larry Mackall

(57) ABSTRACT

A method for providing hardware support for memory protection and virtual memory address translation for a virtual machine. The method includes executing a host machine application within a host machine context and executing a virtual machine application within a virtual machine context. A plurality of TLB (translation look aside buffer) entries for the virtual machine context and the host machine context are stored within a TLB. Memory protection bits for the plurality of TLB entries are logically combined to enforce memory protection on the virtual machine application.

21 Claims, 9 Drawing Sheets

METHOD AND SYSTEM FOR PROVIDING HARDWARE SUPPORT FOR MEMORY PROTECTION AND VIRTUAL MEMORY ADDRESS TRANSLATION FOR A VIRTUAL MACHINE

This application is a continuation of U.S. patent application Ser. No. 10/607,934, now U.S. Pat. No. 7,111,146, entitled "A METHOD AND SYSTEM FOR PROVIDING HARDWARE SUPPORT FOR MEMORY PROTECTION AND VIRTUAL MEMORY ADDRESS TRANSLATION FOR A VIRTUAL MACHINE" by Peter Anvin, filed on Jun. 27, 2003, which is incorporated herein in its entirety.

TECHNICAL FIELD

The present invention relates generally to digital computer systems. More specifically, the present invention pertains to efficiently implementing support for a virtual machine and applications executing within the virtual machine.

BACKGROUND ART

Many types of digital computer systems are used to implement virtual machines and support for applications that execute within virtual machines. Generally, the term "virtual machine" refers to a computer system image or process that supports multiple computer system images/processes. Each image can contain an operating system and its associated applications, or alternatively, each image may have the same operating system or a different respective operating systems. Some prior art computer systems are specifically built with hardware circuits that support virtual machine capability, however, most prior art computer systems are configured to support virtual machine entirely through software. These prior art solutions are limited in their performance and usefulness due to fact that software support requires very slow software based emulation while the hardware support only implements primitive early generation processor platforms. Thus what is required is a solution that can efficiently implement hardware support for full capability virtual machines and applications executing within virtual machines.

DISCLOSURE OF THE INVENTION

Embodiments of the present invention provide a method and system for implementing hardware support for memory protection and virtual memory address translation for a virtual machine.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
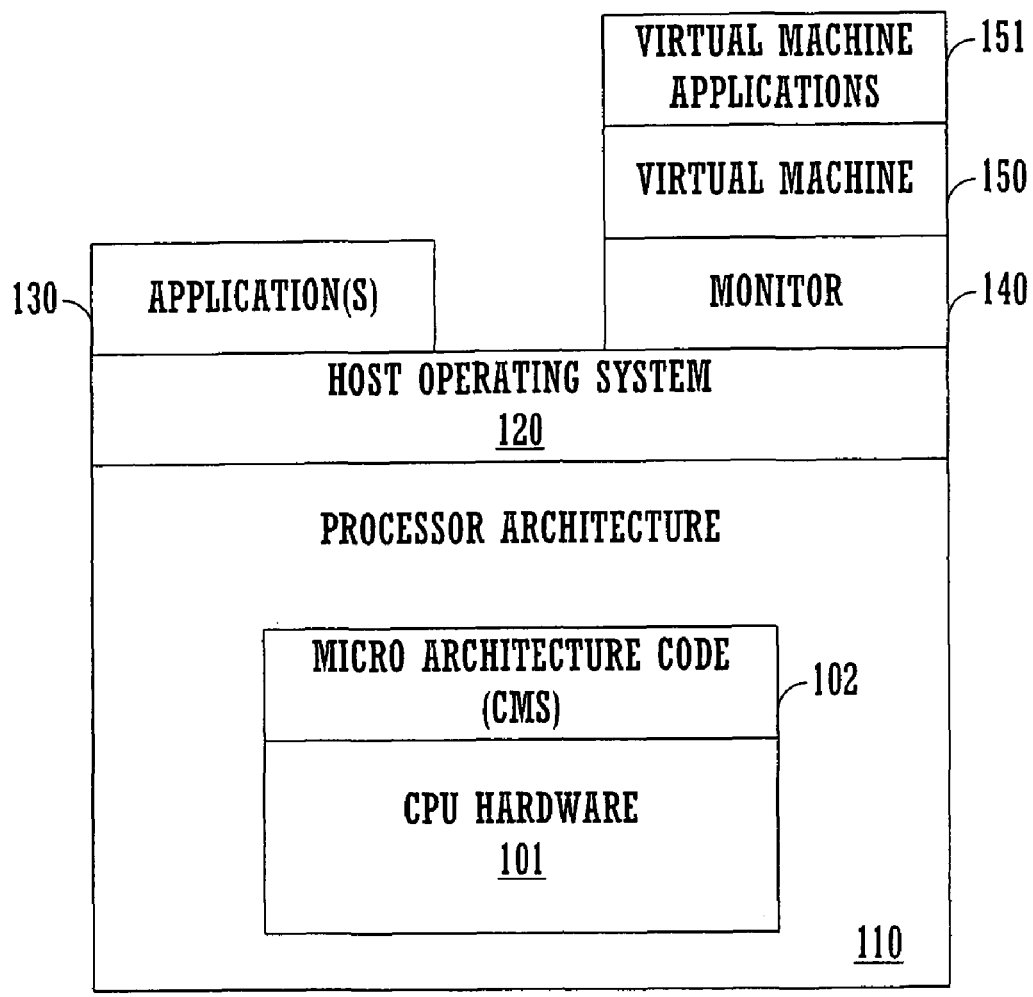
FIG. 1 shows a diagram of a computer system configured for supporting a virtual machine and virtual machine applications in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for providing hardware support for virtual memory address translation for a virtual machine. The method includes executing a host machine application within a host machine context and executing a virtual machine application within a virtual machine context. A plurality of TLB (translation look aside buffer) entries for the virtual machine context and the host machine context are stored within a TLB. Hardware support is provided for virtual memory address translation for the virtual machine application by using the cached translations stored in the TLB. Additionally, embodiments of the present invention provide hardware support for memory protection for the virtual machine application, in addition to the host machine application. To implement memory protection, memory protection bits for the plurality of TLB entries are logically combined to enforce memory protection on the virtual machine application. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., system 600 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

FIG. 1 shows a diagram of a computer system 100 configured for supporting input/output for a virtual machine in accordance with one embodiment of the present invention. As depicted in FIG. 1, system 100 shows a processor architecture 110, including a CPU hardware unit 101 and micro architecture code 102. A host operating system 120 is configured to execute on the platform provided by the processor architecture 110. The host operating system 120 supports the execution of one or more applications 130 and a monitor 140. The monitor 140 provides support for the execution of a virtual machine 150 which in turn supports the execution of one or more virtual machine applications 151.

The system 100 embodiment implements a method and system for supporting input/output for a virtual machine (e.g., virtual machine 150). In the present embodiment, the monitor 140 provides the operating environment for the execution of the virtual machine 150 and the one or more virtual machine applications 151. The monitor 140 is supported by the host operating system 120.

The host operating system 120 provides execution resources (e.g., memory, device driver support, I/O, and the like) for both the applications 130 and the monitor 140. The host operating system 120 executes within its own context (e.g., with its own address space). The host operating system 120 operates with a host machine page table to implement virtual memory. The host operates system 120 can provide memory protection between the applications 130 and the monitor 140 and its virtual machine 150 and virtual machine applications 151. In this manner, the data and resources of the components 140-151 are generally handled by the host operates system 120 in the same manner as other applications 130.

The virtual machine 150 runs within the address space provided by the monitor 140. The virtual machine 150 executes within its own context (e.g., within its own address space) with respect to the host operating system 120. Within the virtual machine 150, virtual machine applications 151 can further define other processes which run within the address space of the virtual machine 150. For example, one of the virtual machine applications 151 can be an operating system, wherein the operating system allocates and manages processes/address space for other virtual machine applications running on top of the virtual machine 150. In this manner, the virtual machine 150 can support its own operating system which subsequently supports its own applications, each being provided with memory protection. Similarly, multiple virtual machines like virtual machine 150 can be implemented by the monitor 140, with each virtual machine being provided with its own address space/process.

Figure 2:
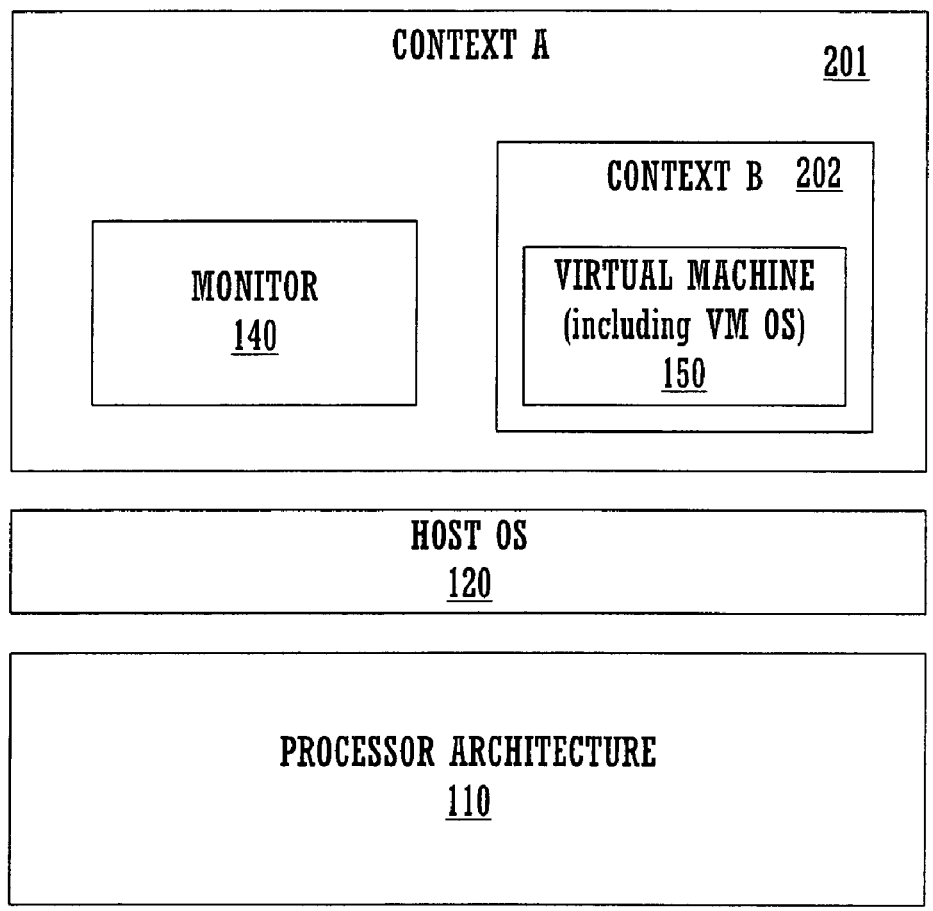
FIG. 2 shows a diagram depicting the host machine executing within a first context and the virtual machine executing within a second context in accordance with one embodiment of the present invention.

In the present embodiment, the applications 130 and the monitor 140 typically execute within their own respective processes, as provided by the host operating system 120. They each have their own respective address spaces. Memory protection and processor cycle allocation is handled by the host operating system 120. Virtual memory management, interrupt allocation, and the like for the applications 130 and the monitor 140 are handled by the host operating system 120. Thus, the host operating system 120 runs in a different process with respect to the applications 130 or the monitor 140. The host operating system 120 executes on top of the processor architecture 110. This relationship is depicted in FIG. 2 below.

In one embodiment, system 100 of the present invention provides a unique processor architecture 110 to provide much faster virtual machine performance in comparison to the prior art. The system 100 embodiment provides the performance benefits, in part, by executing virtual machine application instructions using micro architecture code 102 of the processor architecture 110. In comparison, whereas some prior art computer systems include specially built hardware circuits that support virtual machine capability, and whereas other prior art computer systems support virtual machine capabilities entirely through software, the system 100 embodiment of the present invention utilizes specific attributes of the processor architecture 110 to realize performance benefits in executing the virtual machine 150.

In one embodiment, the micro architecture code 102 in conjunction with the CPU hardware 101 provide a unique processor environment that supports the emulation required to implement the virtual machine 150. This unique processor environment is specifically configured to execute emulation and translation much faster than prior art processor architectures. This allows the processor architecture 110 to provide a fully functional virtual machine 150, having all of the attributes of a conventional real machine, that executes much faster than the prior art software only approach.

Additionally, the virtual machine 150 is a fully functional virtual machine. For example, embodiments of the virtual machine 150 have full support for interrupts, 32-bit memory addressing, virtual memory management, protected memory, and the like, in comparison to the limited capabilities provided by prior art hardware based virtual machine support (e.g., x8086 virtual mode, etc.). Thus the system 100 embodiment of the present invention provides a solution that can efficiently implement support for full featured virtual machines and the applications executing within the virtual machines.

Figure 5:
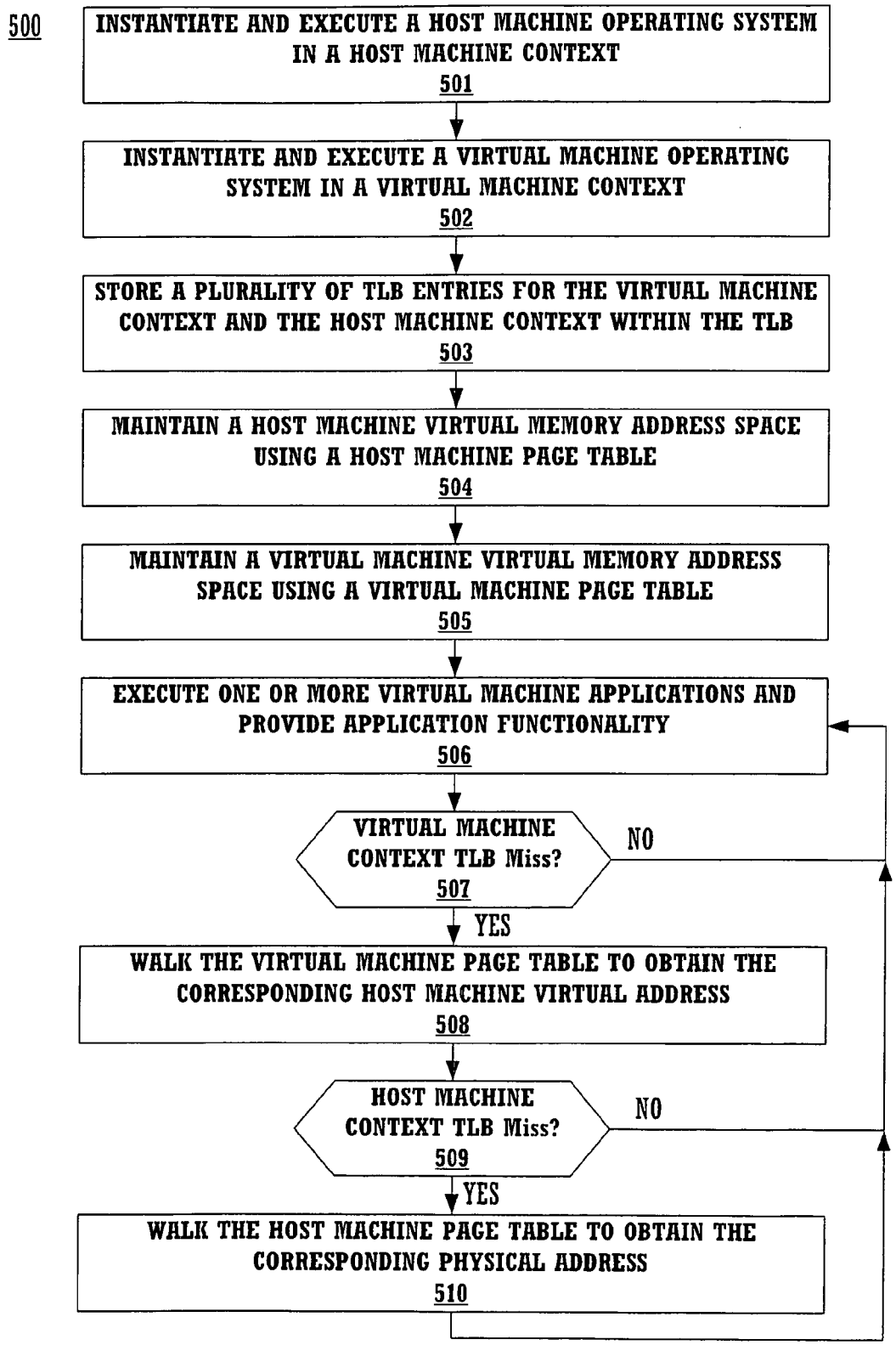
FIG. 5 shows a flowchart of the steps of a process for providing hardware support for virtual memory address translation for a virtual machine in accordance with one embodiment of the present invention.

In one embodiment, the processor architecture 110 is specifically configured to implement a translation and emulation process. For example, depending upon the specific requirements of a particular implementation, non-native target applications (e.g., x86 applications) are emulated and translated using native micro architecture code 102 (e.g., VLIW code). The CPU hardware 101 executing the micro architecture code 102 can be a VLIW (very long instruction word) CPU hardware unit. In such an implementation, the VLIW instructions would be configured to efficiently feed multiple pipeline front ends of the CPU hardware 101 to achieve maximum concurrency and parallelism. In such an embodiment, the micro architecture code 102 can be used to implement specialized "code morphing software" (CMS) to support the efficient execution of the non-native target instructions on the CPU hardware 101. A basic diagram of such a processor architecture is shown in FIG. 5 below. Additional descriptions of processor architectures implementing translation can be found in commonly assigned U.S. Pat. No. 5,958,061, HOST MICROPROCESSOR WITH APPARATUS FOR TEMPORARILY HOLDING TARGET PROCESSOR STATE, which is incorporated herein in its entirety.

FIG. 2 shows a diagram depicting the host machine 120 (e.g., a host operating system) executing within a first context 201 and the virtual machine 150 (e.g., a virtual machine operating system 150) executing within a second context 202. Both contexts 201-202 execute on top of the processor architecture 110.

In the present embodiment, as described above, the host machine 120 operates as its own context, or process, with respect to the virtual machine 150. Generally, threads executing within the host machine's context 201 have access to each other's memory addresses. Similarly, threads executing within the virtual machine's context 202 have access to each other's memory addresses. In the present embodiment, virtual memory management is handled by the host operating system (e.g., host OS) executing within the host machine 120. Thus, processor resources, data files, interrupt scheduling and the like for the other processes (including the virtual machine 150) executing on the processor architecture 110 are managed through the host machine 120.

The virtual machine 150 can execute its own virtual machine operating system and manage its own virtual memory on top of the processor resources, data files, interrupt scheduling, and the like provided by the host machine operating system 120. In this manner, the virtual machine 150 can function as its own self-contained computer system, and appears as its own computer system to the applications that execute on top of the virtual machine operating system 150 (e.g., other virtual machine applications 151 shown in FIG. 1).

Thus, for example, in one embodiment, the virtual machine 150 can execute a Microsoft Windows™ compatible operating system, complete with virtual memory, etc., within the context 202, while the real machine, or host machine 120, executes, for example, a Linux operating system, or the like.

Embodiments of the present invention provide for a much faster execution of the virtual machine 150 in comparison to the prior art. The system 100 embodiment implements hardware support for virtual memory address translation for the virtual machine 150. This provides much faster virtual machine execution in comparison to the prior art, where software only routines are required to manage virtual address translation of the virtual machine 150. Embodiments of the present invention utilize the address translation hardware of the processor architecture 110 and the computer system to accelerate physical address lookups for virtual memory addresses. This process is shown in FIG. 3 below.

Figure 3:
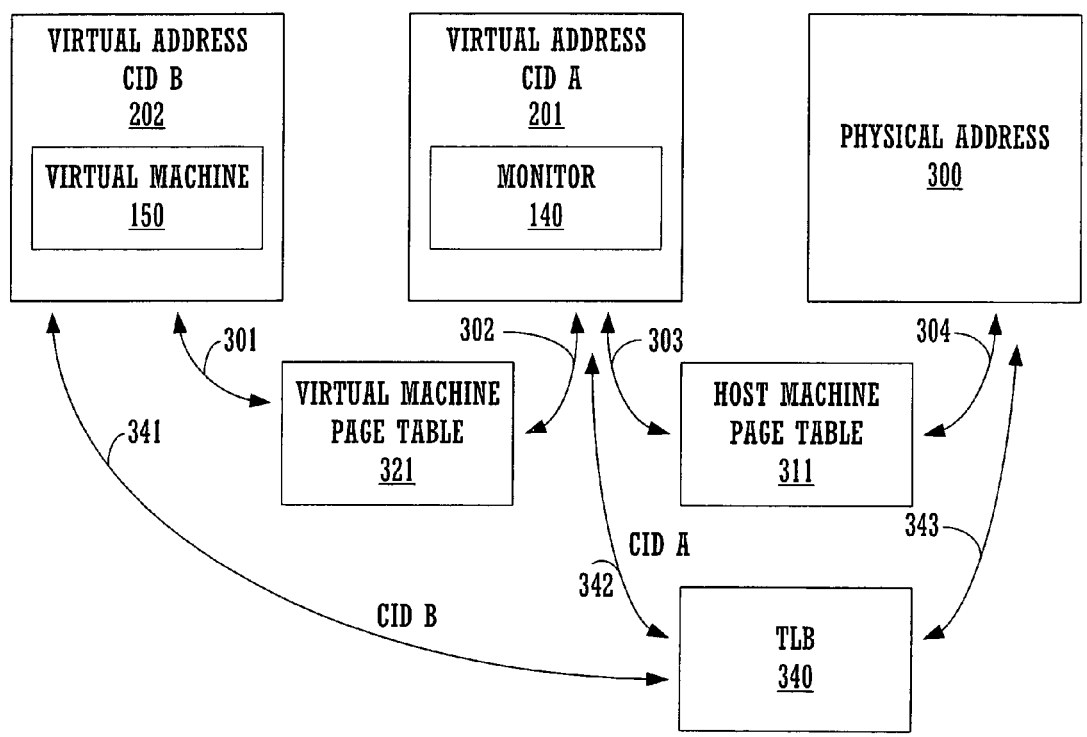
FIG. 3 shows a diagram of a virtual memory translation method in accordance with one embodiment of the present invention.

FIG. 3 shows a diagram of a virtual memory translation method in accordance with one embodiment of the present invention. As depicted in FIG. 3, a virtual address space 320 of the virtual machine 150 is shown with respect to a virtual address space 310 of the host machine 120 and the physical address space 300 of the computer system (e.g., computer system 600 of FIG. 6).

As described above, a host operating system executes within the host machine 120 and manages the virtual address space of the host machine. This is depicted in FIG. 3 as the address space 310 using a host machine page table 311 to map to the physical addresses 300 of the computer system, as shown by lines 303-304.

A TLB 340 is used to cache a subset of the translations from the virtual address space 310 to the physical addresses 300. As is well known, when a TLB "hit" occurs, the physical address translation is rapidly returned by the TLB since the virtual address-to-physical address translation is stored as an entry in the cache. This is shown by lines 342-343. When a TLB miss occurs, the host machine page table 311 must be "walked" in order to find the virtual address-to-physical address translation (e.g., lines 303-304).

In the present embodiment, entries within the TLB 340 for the host machine virtual address space 310 include a context identifier (CID A) that identifies the entry as one from the host machine's virtual address space 310. Similarly, entries within the TLB 340 for the virtual machine virtual address space 320 include a context identifier (CID B) that identifies the entry as one from the virtual machine's virtual address space 320. This allows the TLB 340 to accelerate translations between the virtual machine virtual address space 320 and the physical addresses 300. This is shown by line 341 and line 343.

Thus, TLB 340 provides hardware support for virtual address translations for both the virtual machine virtual address space 320 and the host machine virtual address space 310 to the physical addresses 300. In accordance with embodiments of the present invention, the TLB 340 includes entries having respective context identifiers for both the virtual machine virtual address space 320 and the host machine virtual address space 310. By using a single TLB 340 in the manner described above, embodiments of the present invention greatly accelerate the execution of the virtual machine 150 in comparison to the prior art. For example, when virtual addresses 320 need to be translated into physical addresses 300, TLB hits make the translation just as fast as host machine virtual addresses 310 being translated to physical addresses 300.

When a TLB miss occurs during a virtual machine virtual address translation, a conventional page table walk is executed. The virtual machine page table 321 is walked to obtain a host machine virtual address corresponding to a virtual machine virtual address (e.g., lines 301-302). If another TLB miss occurs, where this obtained host machine virtual address is not in the TLB 340, the host machine page table 311 is walked to obtain the corresponding physical address (e.g., lines 303-304).

Generally, the TLB 340 caches the most recent address translations. Thus, TLB misses usually result in the entries of the TLB 340 being updated with the more recent address translations.

Figure 4:
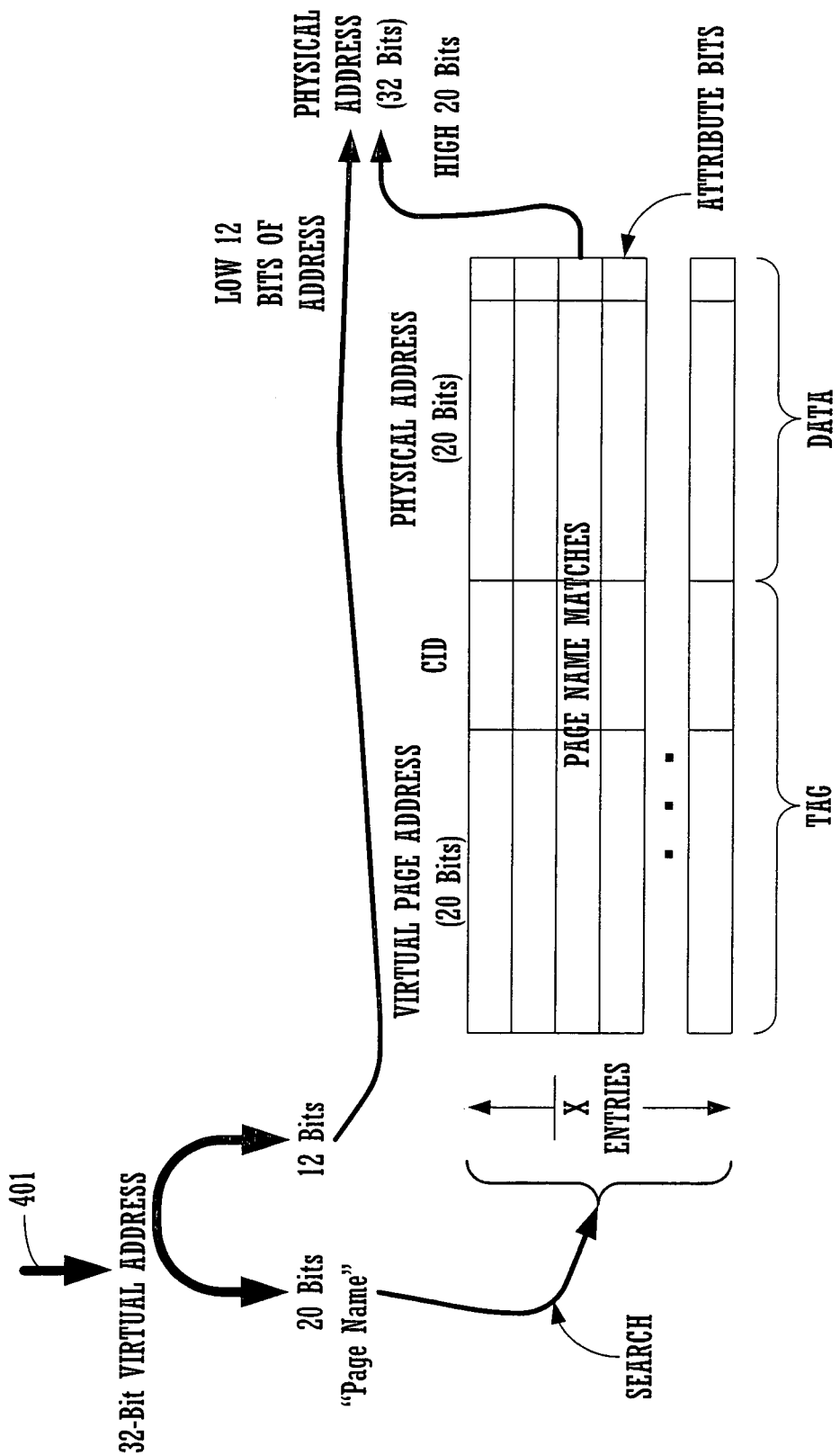
FIG. 4 shows a diagram of a plurality of entries of a TLB in accordance with one embodiment of the present invention.

FIG. 4 shows a diagram of the entries of the TLB 340 in accordance with one embodiment of the present invention. An example wherein 32-bit addresses 401 are used is shown. However, it should be noted that embodiments of the present invention are not limited to any particular 32-bit addressing configuration. For example, embodiments of the present invention are equally applicable to 16-bit, 64-bit, etc. types of addressing configurations. Similarly, although the tags with which the TLB is indexed are shown as being 20 bits in length, embodiments of the present invention are equally applicable to other configurations. As depicted in FIG. 4, the size of each page is $2^{12}$ bits (e.g., the lower 12 bits of an address) and the tag size is 20 bits (e.g., the upper 20 bits of an address). FIG. 4 also depicts attribute bits (e.g., sometimes referred to as control bits) appended to the end of each entry as shown.

Generally, with virtual addresses comprising incoming 32-bit data words as shown, the most significant 20 bits (e.g., the page name) comprise a tag and are used to search the "x" number of entries of the TLB (e.g., 48 entries, 96 entries, or more) for tag matches (e.g., page name matches). The least significant 12 bits of the incoming virtual address indicate which byte of a page is addressed and become the least significant 12 bits of the physical address, as shown. The context identifier (CID), and other control bits, are included with both the 20 bits of the virtual page address and the 20 bits of the physical address. The output of the TLB is the most significant 20 bits and of the physical address, or sometimes referred to as the page frame address.

Referring now to FIG. 5, a flowchart of the steps of a process 500 for providing hardware support for virtual memory address translation for a virtual machine is shown. Process 500 is below described with reference to the system 100 diagram depicted in FIG. 3.

Process 500 begins in step 501, where a host machine operating system is instantiated and begins executing within a host machine context (CID A). In step 502, a virtual machine operating system is instantiated and begins executing within a virtual machine context (CID B). In step 503, a plurality of TLB entries are stored within the TLB 340 for both the virtual machine context and the host machine context. The storing is conducted by the memory management hardware of the processor architecture (e.g., processor architecture 110) and the computer system architecture (e.g., computer system 600). As described above, the entries of the TLB 340 include context identifiers that indicate the context a particular entry belongs to. The host operating system executes within the host machine context, in this case CID A, while the virtual machine operating system executes within the virtual machine context, CID B. The context identifiers allow entries from both contexts to share the common TLB cache.

In step 504, a host machine virtual memory address space 310 is maintained using a host machine page table 311. In step 505, a virtual machine virtual memory address space 320 is maintained using a virtual machine page table 321. As described above, the page tables 311 and 321 allow the respective operating systems to maintain memory protection for multiple processes executing on top of them. Thus, the host operating system can maintain memory protection for other applications besides the virtual machine that execute on top of it (e.g., on top of the host machine 120). Similarly, the virtual machine operating system can maintain memory protection for the applications that execute on top of the virtual machine (e.g., virtual machine 150).

In step 506, one or more virtual machine applications are executed and provide their application functionality to the user. The virtual machine applications execute on top of the virtual machine 150 and update the state data of the virtual machine 150. In the present embodiment, input and output with the user is managed through the host operating system. Access to computer system resources, such as device drivers and the like, is also managed through the host operating system. To the user, support for the virtual machine applications occurs transparently, and the virtual machine applications function as if they were running on their own dedicated real machine.

In step 507, virtual addresses 320 of the virtual machine 150 are translated into physical addresses 300 by the TLB 340. In accordance with embodiments of the present invention, this hardware supported translation greatly increases the execution speed of the virtual machine applications. So long as the virtual addresses are contained within the TLB 340, execution of the virtual machine applications continues as indicated in step 506. In the case of a virtual machine context TLB miss, process 500 proceeds to step 508 where the virtual machine page table 321 is walked to obtain the corresponding host machine virtual address 310.

In step 509, the obtained host machine virtual address is checked against the TLB 340. If the host machine virtual address is in the TLB 340, the corresponding physical address is retrieved and virtual machine application processing continues as indicated by step 506. In the case of a host machine context TLB miss, process 500 proceeds to step 510 where the host machine page table 311 is walked to obtain the corresponding physical address 300. As in step 508, once the corresponding physical addresses obtained, the execution of the virtual machine applications can continue. Additionally, as TLB misses occur, the entries of the TLB 340 can be updated to contain the more recent virtual address to physical address translations for both the host machine context (CID A) and the virtual machine context (CID B). In this manner, embodiments of the present invention implement a method and system for providing hardware support for virtual memory address translation for a virtual machine.

Figure 6:
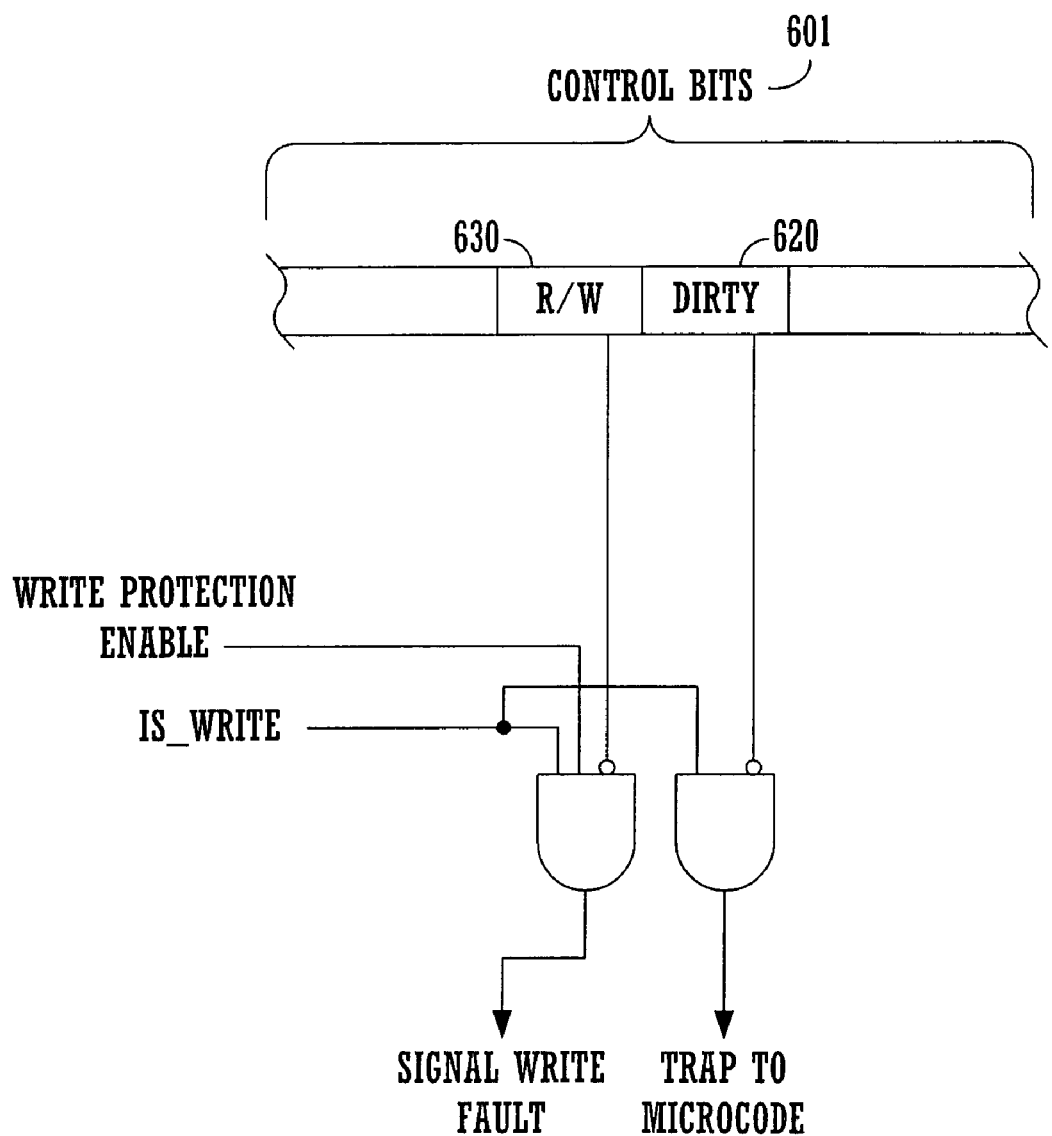
FIG. 6 shows a computer system in accordance with one embodiment of the present invention.

FIG. 6 shows a diagram depicting a plurality of control bits 601 as used in embodiments of the present invention. As depicted in FIG. 6, the control bits 601 include a dirty bit indicator, or dirty bit, 620, and a read/write bit indicator, R/W bit 630.

Embodiments of the present invention provide hardware support for memory protection in addition to providing hardware support for virtual memory address translation for a virtual machine. In one embodiment, this is accomplished by using the control bits 601 of the various TLB entries (e.g., the "x" entries of the TLB depicted in FIG. 4) to convey memory protection information to both a virtual machine application and a host machine application. Thus, for example, in a manner similar to the way the plurality of bits comprising the CID 610 describe the context to which the TLB entry belongs, control bits can be used to describe read or write protections accorded to the TLB entry. In the embodiment depicted in FIG. 6, the read/write bit 630 and the dirty bit 620 are used to indicate read and write protections for a given TLB entry. FIG. 6 also shows the logic used where write protection is enabled or disabled by the computer system using the read/write bit 630 and a dirty bit 620.

As known by those skilled in the art, is important that memory protections afforded by a host operating system are respected by other applications that execute on the machine. For example, read and/or write protections afforded to a given virtual address need to be respected by other applications, otherwise memory corruption can result. The problem involves the fact that in some circumstances (e.g., as in a case where the virtual machine application is an operating system), the virtual machine application executing within the virtual machine manipulates virtual addresses and may not respect the read/write protections afforded to the addresses by the host operating system.

One embodiment of the present invention utilizes the functioning of the dirty bit 620 to solve the above described memory protection problem. In such embodiment, since the dirty bit 620 is observed and respected by operating systems executing in both the virtual machine context and the host machine context, the dirty bit 620 is used to enforce memory protection on the virtual machine operating system, or other virtual machine applications. In the embodiment shown in FIG. 6, when write protection is enabled and upon the assertion of a write signal (is_write), the improper use of the read/write bit 630 will signal a write fault and the improper use of the dirty bit 620 will cause a trap to microarchitecture code (e.g., to handle the situation).

Figure 7:
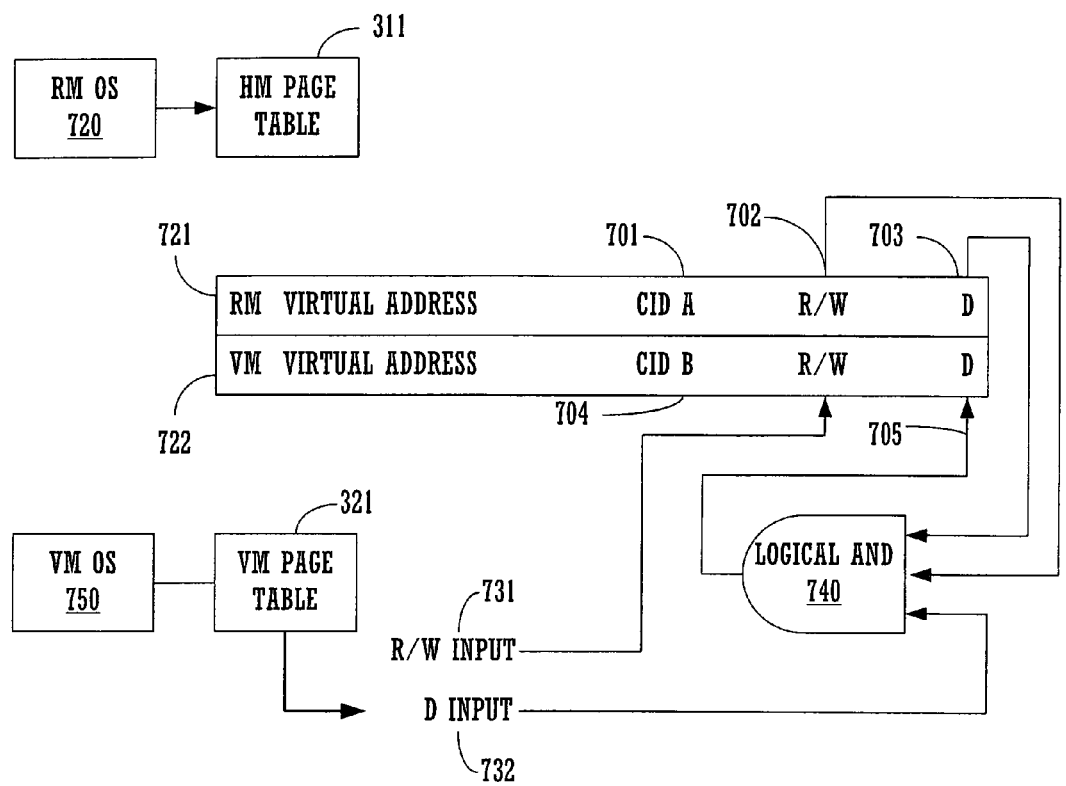
FIG. 7 shows a diagram depicting the hardware support for memory protection for the virtual machine operating system in accordance with one embodiment of the present invention.

FIG. 7 shows a diagram depicting the hardware support for memory protection for the virtual machine operating system in accordance with one embodiment of the present invention. As depicted in FIG. 7, two virtual addresses 721 and 722 are shown. A real machine (e.g., host machine) operating system 720 is shown and a virtual machine operating system 750 shown.

As described above, in one embodiment, the functioning of the dirty bit, in this case dirty bit 703 and dirty bit 705, is used to enforce memory protection. In the present embodiment, the control bit inputs from the real machine operating system 720 and the virtual machine operating system 750 are logically combined using a logical AND operation 740 to determine the state of the dirty bit 705 for the virtual machine virtual address 722. For example, through its normal operation, the real machine operating system 720 will determine the state of the read/write bit 702 and the dirty bit 703. The bits 702-703 are logically combined with the dirty bit input 732 from the virtual machine operating system 750 using the operator 740. This results in the dirty bit 705, which is stored in the virtual address 722. The read/write input 731 is directly stored within the virtual address 722 as the read/write bit, as shown.

Thus, although the virtual machine operating system 750 may not respect read/write inputs from the real machine operating system 720, the virtual machine operating system 750 will respect dirty bit states set by the real machine operating system 720. For example, the dirty bit input 732 from the virtual machine operating system 750 and the read/write bit 702 and the dirty bit 703 from the real machine operating system 720 must all be asserted (e.g., asserted high) in order for the dirty bit 705 to be asserted. If the dirty bit 705 is asserted, the address 722 can be safely written to by the virtual machine operating system 750, otherwise, the address 722 is protected and cannot be written to by the virtual machine operating system 750.

Figure 8:
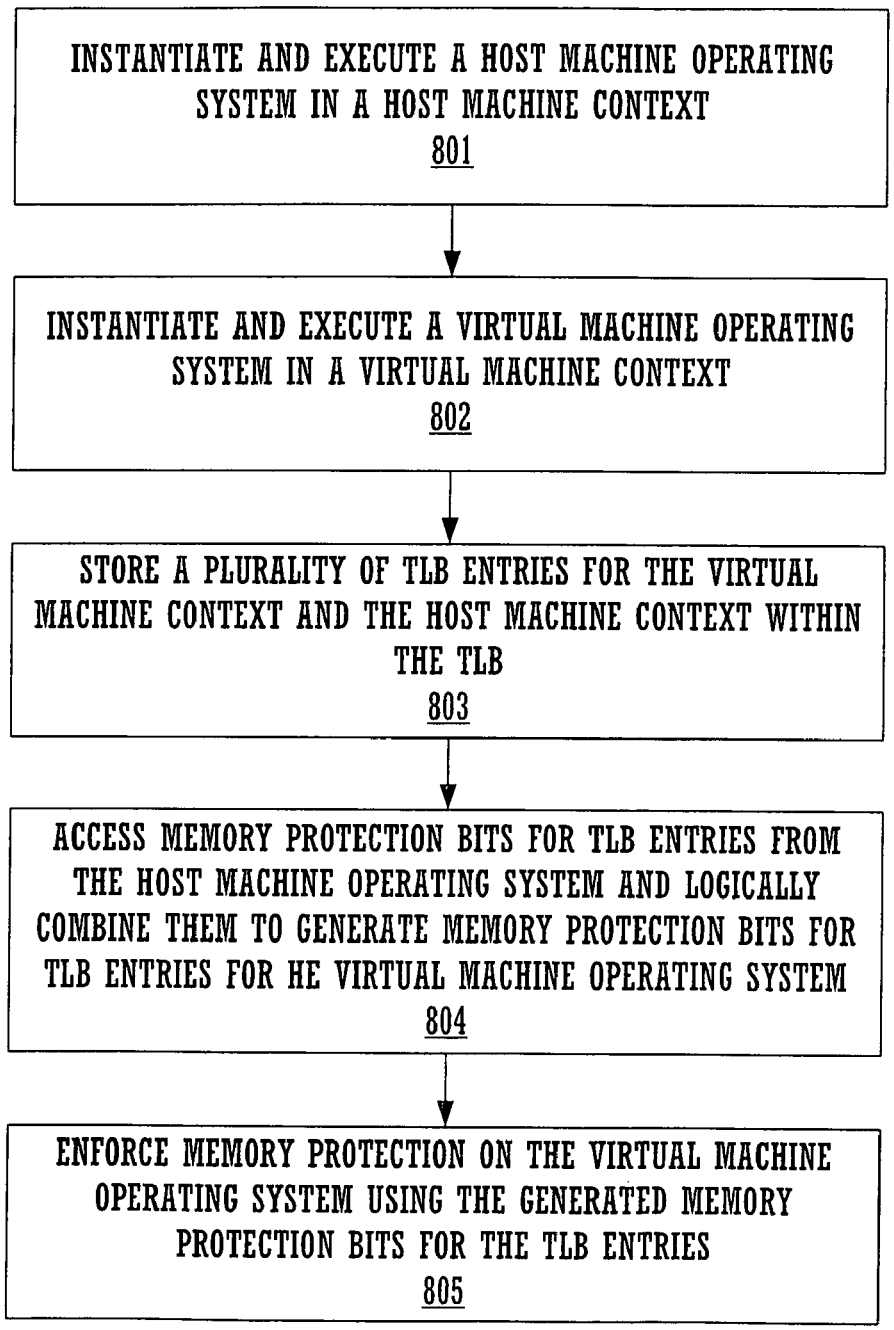
FIG. 8 shows a flowchart of a process for providing hardware support for memory protection in accordance with one embodiment of the present invention.

FIG. 8 shows a flowchart of a process 800 for providing hardware support for memory protection in accordance with one embodiment of the present invention. As depicted in FIG. 8, process 800 shows the steps involved in providing memory protection for a virtual machine operating system and host machine operating system.

Process 800 begins in step 801, where a host machine operating system is instantiated and executed in a host machine context (CID A). In step 802, a virtual machine operating system is instantiated and executed in a virtual machine context (CID B). In step 803, a plurality of TLB entries for the virtual machine context and the host machine context are stored within the TLB. In step 804, process 800 of the present embodiment accesses memory protection bits for TLB entries from the host machine operating system and logically combines them with memory protection bits from the virtual machine operating system to generate the appropriate memory protection bits to enforce memory protection. As described above, although the virtual machine operating system (e.g., virtual machine operating system 750) may not respect read/write protections from the real machine operating system (e.g., real machine operating system 720), the virtual machine operating system 750 will respect dirty bit states set by the real machine operating system 720. Subsequently, in step 805, memory protection is enforced on the virtual machine operating system using the generated control bits for the TLB entries.

Computer System Platform

Figure 9:
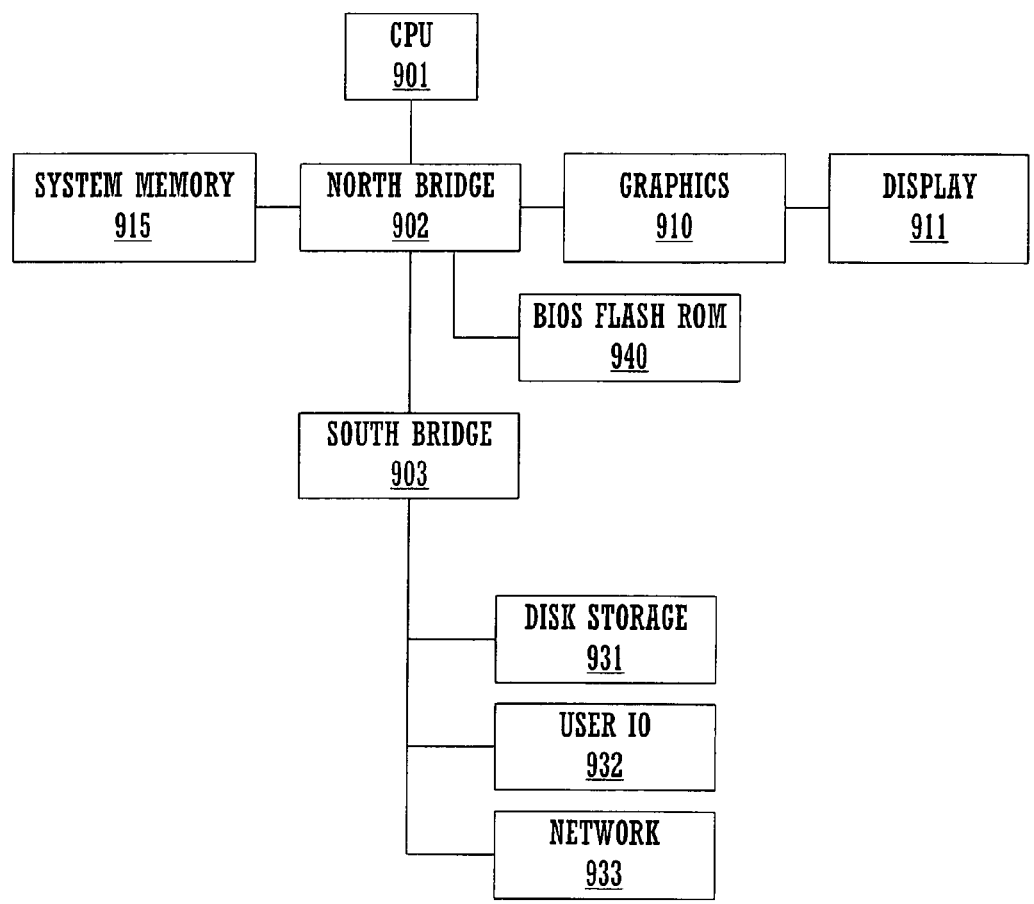
FIG. 9 shows a diagram of a computer system in accordance with one embodiment of the present invention.

With reference now to FIG. 9, a computer system 900 in accordance with one embodiment of the present invention is shown. Computer system 900 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 900) and are executed by the CPU 901 of system 900. When executed, the instructions cause the system 900 to implement the functionality of the present invention as described above.

In general, system 900 comprises at least one CPU 901 coupled to a North bridge 902 and a South bridge 903. The North bridge 902 provides access to system memory 915 and a graphics unit 910 that drives a display 911. The South bridge 903 provides access to a plurality of coupled peripheral devices 931 through 933 as shown. Computer system 900 also shows a BIOS ROM 940 that stores BIOS initialization software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, comprising:
executing a host machine application within a host machine context;
executing a virtual machine application within a virtual machine context;
storing a plurality of TLB (translation look aside buffer) entries for the virtual machine context and the host machine context within a physical TLB, wherein the TLB entries include a plurality of memory protection bits; and
controlling access from the virtual machine context to a TLB entry of the physical TLB, wherein said controlling access includes:
performing a logical operation with first and second memory protection bits of the TLB entry and a memory protection bit, which is unavailable in the TLB entry, from the virtual machine context to determine a result; and
storing the result in the TLB entry and permitting access to the TLB entry based on the result.

2. The method of claim 1, wherein at least one of the first and second memory protection bits is a dirty bit.

3. The method of claim 1, wherein at least one of the first and second memory protection bits is a read/write bit.

4. The method of claim 1, wherein the logical operation is a logical AND operation.

5. The method of claim 1, wherein the host machine application is a host machine operating system that executes within the host machine context and the virtual machine application is a virtual machine operating system that executes within the virtual machine context.

6. The method of claim 1, wherein the TLB entries include respective context identifiers enabling the TLB entries to provide physical address translation for virtual addresses from both the host machine context and the virtual machine context.

7. The method of claim 1 further comprising:
    updating the physical TLB with new entries if a virtual machine TLB miss occurs or a host machine TLB miss occurs, wherein the controlling access enforces memory protection on the virtual machine application.

8. A system, comprising:
    a processor architecture including micro architecture code configured to execute on a CPU hardware unit of the processor architecture; and
    an address translation cache for implementing a physical translation look aside buffer, wherein memory stores instructions of the micro architecture code cause the system to perform operations for memory protection, wherein the memory stores instructions comprise:
    instructions to execute a host machine application within a host machine context;
    instructions to execute a virtual machine application within a virtual machine context;
    instructions to store a plurality of TLB (translation look aside buffer) entries for the virtual machine context and the host machine context within the physical TLB, wherein the TLB entries include a plurality of memory protection bits; and
    instructions to control access from the virtual machine context to a TLB entry of the physical TLB, wherein the instructions to control access comprise:
        instructions to perform a logical operation with first and second memory protection bits of the TLB entry and a memory protection bit, which is unavailable in the TLB entry, from the virtual machine context to determine a result; and
        instructions to store the result in the TLB entry and to permit access to the TLB entry based on the result.

9. The system of claim 8, wherein at least one of the first and second memory protection bits is a dirty bit.

10. The system of claim 8, wherein at least one of the first and second memory protection bits is a read/write bit.

11. The system of claim 8, wherein the logical operation is a logical AND operation.

12. The system of claim 8, wherein the host machine application is a host machine operating system that executes within the host machine context and the virtual machine application is a virtual machine operating system that executes within the virtual machine context.

13. The system of claim 8, wherein the TLB entries include respective context identifiers enabling the TLB entries to provide physical address translation for virtual addresses from both the host machine context and the virtual machine context.

14. The system of claim 8, wherein the memory stores instructions further comprise:
    instructions to update the physical TLB with new entries if a virtual machine TLB miss occurs or a host machine TLB miss occurs.

15. A computer readable storage device comprising computer readable code stored therein, the computer readable code comprising:
    computer readable code to execute a host machine application within a host machine context;
    computer readable code to execute a virtual machine application within a virtual machine context;
    computer readable code to store a plurality of TLB (translation look aside buffer) entries for the virtual machine context and the host machine context within a physical TLB, wherein the TLB entries include a plurality of memory protection bits; and
    computer readable code to control access from the virtual machine context to a TLB entry of the physical TLB, wherein the computer readable code to control access comprises:
        computer readable code to perform a logical operation with first and second memory protection bits of the TLB entry and a memory protection bit, which is unavailable in the TLB entry, from the virtual machine context to determine a result; and
        computer readable code to store the result in the TLB entry and to permit access to the TLB entry based on the result.

16. The computer readable storage device of claim 15, wherein at least one of the first and second memory protection bits is a dirty bit.

17. The computer readable storage device of claim 15, wherein at least one of the first and second memory protection bits is a read/write bit.

18. The computer readable storage device of claim 15, wherein the logical operation is a logical AND operation.

19. The computer readable storage device of claim 15, wherein the host machine application is a host machine operating system that executes within the host machine context and the virtual machine application is a virtual machine operating system that executes within the virtual machine context.

20. The computer readable storage device of claim 15, wherein the TLB entries include respective context identifiers enabling the TLB entries to provide physical address translation for virtual addresses from both the host machine context and the virtual machine context.

21. The computer readable storage device of claim 15, wherein the computer readable code further comprises:
    computer readable code to update the physical TLB with new entries if a virtual machine TLB miss occurs or a host machine TLB miss occurs.

* * * * *

UNITED STATES PATENT AND TRADEMARK OFFICE
CERTIFICATE OF CORRECTION

| | | |
|---|---|---|
| PATENT NO. | : 8,041,876 B1 | Page 1 of 1 |
| APPLICATION NO. | : 11/500575 | |
| DATED | : October 18, 2011 | |
| INVENTOR(S) | : Anvin | |

It is certified that error appears in the above-identified patent and that said Letters Patent is hereby corrected as shown below:

Column 1, line 6, below Title, insert -- CROSS-REFERENCE TO RELATED APPLICATION --.

Signed and Sealed this
Twenty-fourth Day of April, 2012

David J. Kappos
*Director of the United States Patent and Trademark Office*